US009892519B2

(12) United States Patent
Vejarano et al.

(10) Patent No.: US 9,892,519 B2
(45) Date of Patent: Feb. 13, 2018

(54) METHOD FOR DETECTING AN OBJECT IN AN ENVIRONMENTAL REGION OF A MOTOR VEHICLE, DRIVER ASSISTANCE SYSTEM AND MOTOR VEHICLE

(71) Applicant: VALEO Schalter und Sensoren GmbH, Bietigheim-Bissingen (DE)

(72) Inventors: Camilo Vejarano, Puteaux (FR); Julien Rebut, Yerres (FR)

(73) Assignee: VALEO Schalter und Sensoren GmbH, Bietigheim-Bissingen (DE)

( * ) Notice: Subject to any disclaimer, the term of this patent is extended or adjusted under 35 U.S.C. 154(b) by 195 days.

(21) Appl. No.: 14/863,727

(22) Filed: Sep. 24, 2015

(65) Prior Publication Data

US 2016/0093065 A1 Mar. 31, 2016

(30) Foreign Application Priority Data

Sep. 30, 2014 (DE) .......................... 10 2014 114 221

(51) Int. Cl.
*G06K 9/00* (2006.01)
*G06T 7/20* (2017.01)
(Continued)

(52) U.S. Cl.
CPC .............. *G06T 7/2093* (2013.01); *B60R 1/00* (2013.01); *G06K 9/00805* (2013.01);
(Continued)

(58) Field of Classification Search
CPC ...... G06K 9/00805; G06T 2207/10016; G06T 2207/30261; G06T 2207/10028; G06T 2207/30252
See application file for complete search history.

(56) References Cited

U.S. PATENT DOCUMENTS 6,535,114 B1 * 3/2003 Suzuki ...................... G06T 7/20
340/435
8,121,348 B2 2/2012 Hayasaka et al.
(Continued)

FOREIGN PATENT DOCUMENTS

DE 102012011121 A1 12/2013
WO 2005/037619 A1 4/2005

*Primary Examiner* — Vu Le
*Assistant Examiner* — Guillermo Rivera-Martinez
(74) *Attorney, Agent, or Firm* — Osha Liang LLP

(57) ABSTRACT

A method for detecting an object captured by a camera in an environmental region of a vehicle based on a temporal sequence of images of the environmental region is disclosed. An electronic evaluation device is used to determine at least one characteristic pixel of the object in a first image of the sequence of images, and the determined characteristic pixel is tracked in at least a second image and a flow vector each having a vertical component and a horizontal component is provided by the tracking. A first depth component, which is perpendicular to the vertical component and the horizontal component, is determined based on the vertical component, and a second depth component, perpendicular to the vertical component and the horizontal component, is determined based on the horizontal component. When the first and second depth component correspond within a tolerance range, a validated final depth component is provided.

20 Claims, 13 Drawing Sheets

(51) Int. Cl.
    *B60R 1/00*          (2006.01)
    *G06T 7/579*       (2017.01)
    *G06T 7/269*       (2017.01)
    *G06K 9/32*         (2006.01)

(52) U.S. Cl.
    CPC .............. *G06T 7/269* (2017.01); *G06T 7/579* (2017.01); *B60R 2300/105* (2013.01); *B60R 2300/307* (2013.01); *G06K 2009/3291* (2013.01); *G06T 2207/10016* (2013.01); *G06T 2207/10028* (2013.01); *G06T 2207/30252* (2013.01); *G06T 2207/30261* (2013.01)

(56) References Cited

U.S. PATENT DOCUMENTS

| | | | |
|---|---|---|---|
| 8,412,448 B2 | 4/2013 | Lee et al. | |
| 2005/0165550 A1* | 7/2005 | Okada | G08G 1/166 701/301 |
| 2009/0167844 A1* | 7/2009 | Seki | B60R 1/00 348/47 |
| 2013/0322698 A1* | 12/2013 | Moden | G06T 7/285 382/107 |
| 2014/0153784 A1* | 6/2014 | Gandolph | G06T 7/0075 382/107 |
| 2014/0355685 A1* | 12/2014 | Chen | H04N 19/52 375/240.16 |
| 2015/0304634 A1* | 10/2015 | Karvounis | G06T 7/277 348/46 |

\* cited by examiner

METHOD FOR DETECTING AN OBJECT IN AN ENVIRONMENTAL REGION OF A MOTOR VEHICLE, DRIVER ASSISTANCE SYSTEM AND MOTOR VEHICLE

The invention relates to a method for detecting an object in an environmental region of a motor vehicle based on a temporal sequence of images of the environmental region, which are captured by means of a camera of the motor vehicle, wherein by means of an electronic evaluation device of the motor vehicle, characteristic pixels of the object are determined in a first image of the image sequence of images and the determined characteristic pixels are tracked in at least a second image, and a plurality of flow vectors each having a vertical component and a horizontal component is provided by the tracking. In addition, the invention relates to a driver assistance system for a motor vehicle as well as to a motor vehicle with a driver assistance system.

Methods for detecting an object in an environmental region of a motor vehicle are known from the prior art. Thus, in WO 2005/037619 A1, a method is described, which serves for initiating an emergency braking operation. The method requires that an environment of the vehicle is at least partially captured and an object recognition based on the data of the captured environment is executed. The detected objects are then compared to reference objects. Only objects are taken into account, which are larger than the reference object.

Further, a system for collision avoidance with an image capturing apparatus attached in the front area of the motor vehicle, which captures an image, and a module forming a plurality of 3D models and storing them in a storage medium, is known from U.S. Pat. No. 8,412,448 B2. In addition, an image processing module extracts image data from the captured image and compares it to the 3D model. If an object was then recognized, in a further step, a warning is output.

From U.S. Pat. No. 8,121,348 B2, an object recognition device for vehicles is known, which captures an image of a road in forward direction of travel with a camera unit. A window is shifted over the captured image, from which a histogram is calculated. This histogram is then compared to models from a database to determine if it is a searched object.

From DE 10 2012 011 121 A1, a method for detecting objects in an environmental region of a motor vehicle is known, wherein a plurality of flow vectors is determined by means of an optical flow method. Based on the flow vectors, the objects are detected. Herein, a motion vector of the motor vehicle is also taken into account.

It is the object of the invention to provide a method, a driver assistance system as well as a motor vehicle, by which or in which the object in the environmental region of the motor vehicle can be particularly precisely detected.

According to the invention, this object is solved by a method, by a driver assistance system as well as by a motor vehicle having the features according to the respective independent claims.

In a method according to the invention for detecting an object in an environmental region of a motor vehicle, a temporal sequence of images of the environmental region is generated, which are captured by means of a camera of the motor vehicle. By means of an electronic evaluation device of the motor vehicle, at least one characteristic pixel of the object is determined in a first image of the image sequence of images. In at least a second image, the at least one determined characteristic pixel is tracked, and at least one flow vector each having a vertical component and a horizontal component is provided by the tracking. According to the invention, it is provided that a first depth component perpendicular to the vertical component and the horizontal component is determined based on the vertical component, and a second depth component also perpendicular to the vertical component and the horizontal component is determined based on the horizontal component. If the first depth component corresponds to the second depth component within a tolerance range, a validated final depth component of a tracked characteristic pixel depending on the at least one characteristic pixel is provided.

By the method according to the invention, it thus becomes possible to provide the validated or examined final depth component of the tracked characteristic pixel. The tracked characteristic pixel is the characteristic pixel, which was tracked with the optical flow and provides the flow vector. The method is possible because each of the flow vectors provides the vertical component and the horizontal component. The vertical component and the horizontal component are in the image plane and are perpendicular to each other. Thus, the vertical component can for example be determined in a column of the image over multiple lines of the image, while the horizontal component is determined in a line of the image over multiple columns of the image. Based on the vertical component, thus, a first depth component is determined. The first depth component is oriented perpendicularly to the image plane and for example protrudes into the image. Thus, by the first depth component, it can be determined, how much the respective characteristic pixel is away from the camera and/or the motor vehicle. This of course also applies to the second depth component in analogous manner, which is determined based on the horizontal component. Thus, two depth components or two depth values are finally present, namely the first depth component and the second depth component, which independently of each other describe the depth or the distance of the characteristic pixel to the camera and/or the motor vehicle. Because the respective characteristic pixel can only be disposed in one distance or be provided with one depth value, it is assumed that the validated final depth component or the validated final depth value or the correct depth value is exclusively present if the first depth component corresponds to the second depth component within a tolerance range. Preferably, the tolerance range can be less than or equal to 25 percent or in particular less than or equal to 20 percent or in particular less than or equal to 10 percent or in particular less than or equal to 5 percent or in particular less than or equal to 1 percent. Thus, a particularly reliable final depth component or a particularly reliable depth value of the respective characteristic pixel can be provided.

In particular, it is provided that the vertical component and/or the horizontal component are determined depending on at least one current motion vector of the motor vehicle determined by a unit on the motor vehicle side, in particular a speed and/or a yaw angular speed and/or a pitch angular speed and/or a roll angular speed. Thus, a proper movement of the motor vehicle can be calculated from each image of the sequence of images and thus also from the flow vectors with the current motion vector. Therefore, it can for example also be differentiated between moved and static objects. The motion vector can be determined based on the speed and/or the yaw angular speed and/or the pitch angular speed and/or the roll angular speed. The speed and/or the yaw angular speed and/or the pitch angular speed and/or the roll angular speed can be picked off from the unit on the motor vehicle side or a CAN bus of the motor vehicle.

Preferably, it is provided that in determining the vertical component and/or the horizontal component, a calibration state of the camera, in particular an internal orientation and/or an external orientation, is taken into account. A position of a projection center of the camera relative to the image plane of the image is described by the internal orientation, while the position of the projection center and of a capturing direction of the camera relative to the object is described by the external orientation. Thus, a distortion of the image, which has for example arisen due to a lens of the camera, can be corrected by the calibration state. Furthermore, an association between a position of the object in the image and a position of the object in the real world can be established by the calibration state. Thus, a transformation of the coordinates of the object from a world coordinate system or a terrestrially fixed coordinate system or a motor vehicle coordinate system into a camera coordinate system can also be effected.

In particular, depending on the validated final depth component, a 3D position of the object is determined. The 3D position of the object can be provided depending on the vertical component, the horizontal component and the validated final depth component. The 3D position can be used to provide a plan view or a bird's eye view of the environmental region. Additionally or alternatively, based on the 3D position of the object, a side view and/or a rear view of the object can be effected, whereby a possible obstacle for the motor vehicle can be recognized. Furthermore, a driver of the motor vehicle can particularly fast and simply recognize, where a possible obstacle for the motor vehicle is located, based on the bird's eye view.

Furthermore, it is provided that in determining the characteristic pixels, a grid with multiple cells is taken into account, by which the first image is divided. An advantage of the grid is that the characteristic pixels can be determined such that the distribution thereof in the first image is homogeneous or uniform. Thus, for example, a desired number of characteristic pixels per grid can be determined. Furthermore, the grid offers the advantage that each cell of the grid can be individually processed and thus a basis for a parallelization or a parallel processing of the cells is provided.

Furthermore, the characteristic pixels can be determined depending on a minimum value specifying a minimum number of characteristic pixels per cell, and/or a maximum value specifying a maximum number of characteristic pixels per cell. By the minimum value and/or the maximum value, it can thus be determined which number of characteristic pixels is desired in the respective cell. This is advantageous in that a homogenous distribution of the pixels over the entire image can be generated. Furthermore, it can be prevented that computational effort for determining the characteristic pixels is unnecessarily expended. Thus, this can be the case in cells with many corners and small structures high in contrast. However, on the other hand, it can also be ensured that insufficient characteristic pixels are determined in the respective cells having a low contrast and few corners.

Preferably, it is provided that a direction of each one of the flow vectors is compared to the remaining flow vectors and a direction reliability value is determined from the comparison. Thus, based on the direction reliability value or a consistency value, it can be determined how reliable a respective flow vector is. This can be effected based on a comparison to the remaining flow vectors. Usually, the flow vectors extend in the same direction. If now one of the flow vectors extends in another direction, thus, it can be assumed that this is an outlier. The outlier can for example be caused by a moved object or by an error in tracking the characteristic pixel with for example an optical flow method. For determining the direction reliability value, a 3D position of the characteristic pixel over a temporal progress can also be used.

In a further configuration, it is provided that it is differentiated between static objects and moved objects based on the direction reliability value. Thus, the direction reliability value for the moved objects is less than the direction reliability value for static objects because it is to be assumed that the moved objects do not move in the direction of the majority of the characteristic pixels. If they yet move in the direction of the characteristic pixels of static objects, thus, it can be assumed that this is temporally restricted and subsequently a change of direction occurs. Thus, for example, exclusively characteristic pixels or flow vectors of static objects can be used to determine the final depth component.

Furthermore, it is provided that depending on the flow vectors, a motion vector of the motor vehicle, in particular a speed and/or a yaw angular speed and/or a pitch angular speed and/or a roll angular speed, is determined, which is compared to a motion vector determined by a unit on the motor vehicle side. Thus, it can be provided that the flow vectors are used for determining a motion vector of the motor vehicle, which can then be compared to a motion vector of the motor vehicle provided based on another source, namely for example the unit on the motor vehicle side. Thus, it can for example be examined if the flow vectors have been correctly determined or, if the flow vectors are more trusted, if the motion vector of the unit on the motor vehicle side has been reliably provided.

Furthermore, it is provided that the flow vectors are selected by a RANSAC method. RANSAC (Random Sample Consensus) is an algorithm for estimating a model within a series of measured values with outliers and coarse errors. Herein, it is examined, to what extent a randomly selected flow vector deviates from the other flow vectors and, if the deviation is too great, this flow vector can be excluded from the further procedure as an outlier. Additionally or alternatively, the RANSAC method can be applied to the respective characteristic pixels of the respective flow vectors. Thus, the flow vectors can also be selected rectified from errors or outliers.

In particular, it is provided that for determining the validated final depth component, a predetermined path distance has to be traveled with the motor vehicle and a subsequent validated final depth component is only determined after further traveling the predetermined path distance. Thus, it can for example be that the variation in the scene, which is captured by the temporal sequence of the images, is too low to justify the effort of calculation or of determination of the validated final depth component. If the motor vehicle for example only moves forward very slowly or not at all, thus, the scene hardly changes, and thus the final depth component or the distance of the motor vehicle to the object also hardly changes. Thus, it can be provided that the validated final depth component is determined exclusively after traveling the predetermined path distance. For example, the predetermined path distance can be 10 centimeters or 15 centimeters or 20 centimeters or 30 centimeters or 40 centimeters. Thus, for example, after each 20 centimeters of traveled path distance, the validated depth component is then once determined. Otherwise stated, thus, for example every 20 centimeters, the validated final depth component can be provided and thus unnecessary computational effort can be avoided. Thus, a new 3D position of the respective characteristic pixel or of the object can also only be effected after traveling the predetermined path distance.

In a further configuration, it is provided that the characteristic pixels are combined to at least one cluster based on the vertical component and/or the horizontal component and/or the validated final depth component. Thus, those characteristic pixels can for example be combined, which have a predetermined distance to each other. The predetermined distance can for example be determined based on the vertical component and/or the horizontal component and/or the validated final depth component. The cluster offers the advantage because a common significance can thereby be assigned to the characteristic pixels in the cluster. By the common significance, the characteristic pixels can be better further processed as it could for example be effected in an obstacle warning system of the motor vehicle.

Preferably, it is provided that the respective object is described by one of the at least one cluster. Thus, it can be that each one of the clusters stands for one of the objects. Thus, a possible obstacle for the motor vehicle can then for example be described as a cluster and not as a single characteristic pixel. Furthermore, the possible obstacle can be more reliably determined due to the cluster because multiple of the characteristic pixels may have taken part in the cluster. Thus, if one of the characteristic pixels in the cluster is erroneous, it can be assumed that the remaining characteristic pixels are not affected by this error or outlier.

A driver assistance system according to the invention for a motor vehicle includes a camera and an electronic evaluation unit, which is adapted to perform a method according to the invention.

A motor vehicle according to the invention, in particular a passenger car, includes a driver assistance system according to the invention.

The preferred embodiments presented with respect to the method according to the invention and the advantages thereof correspondingly apply to the driver assistance system according to the invention as well as to the motor vehicle according to the invention.

Further features of the invention are apparent from the claims, the figures and the description of figures. The features and feature combinations mentioned above in the description as well as the features and feature combinations mentioned below in the description of figures and/or shown in the figures alone are usable not only in the respectively specified combination, but also in other combinations or alone, without departing from the scope of the invention. Thus, implementations are also to be considered as encompassed and disclosed by the invention, which are not explicitly shown in the figures and explained, but arise from and can be generated by separated feature combinations from the explained implementations.

Below, embodiments of the invention are explained in more detail based on schematic drawings.

There show:

FIG. 1 in schematic plan view an embodiment of a motor vehicle according to the invention with an embodiment of a driver assistance system according to the invention for detecting an object;

FIG. 2 a camera coordinate system of a camera and a motor vehicle coordinate system of the motor vehicle;

FIG. 3 the camera coordinate system and the motor vehicle coordinate system with a schematic illustration of the motor vehicle;

FIG. 4 a roll angular speed of the motor vehicle with a schematic illustration of the motor vehicle;

FIG. 5 a yaw angular speed of the motor vehicle and a speed of the motor vehicle with a schematic illustration of the motor vehicle;

FIG. 6 a pitch angular speed of the motor vehicle and the speed with a schematic illustration of the motor vehicle;

FIG. 7 a schematic illustration of an image of a temporal sequence of images of an environmental region of the motor vehicle with a plurality of flow vectors;

FIG. 8 a schematic illustration of an image plane of the image with depth components in the camera coordinate system;

FIG. 9 a flow diagram of the method according to the invention;

FIG. 10 a schematic illustration of the image with a 3D position of characteristic pixels;

FIG. 11 a schematic illustration of a plan view of the 3D position of the characteristic pixels;

FIG. 12 a schematic illustration of a side view of the 3D position of the characteristic pixels;

FIG. 13 a schematic illustration of a rear view of the 3D position of the characteristic pixels;

FIG. 14 a schematic illustration of the image, in which detected objects are marked;

FIG. 15 a further schematic illustration of the image, in which the detected objects are marked; and FIG. 16 a further flow diagram of the method according to the invention.

In FIG. 1, a plan view of a motor vehicle 1 with a driver assistance system 2 according to an embodiment of the invention is schematically illustrated. In the embodiment, the driver assistance system 2 includes a first camera 3a, a second camera 3b and an electronic evaluation device 4. According to the embodiment in FIG. 1, the camera 3a is disposed on a windshield 5 of the motor vehicle 1. Thus, according to the embodiment, the camera 3a is oriented such that an environmental region 6 of the motor vehicle 1 in front of the motor vehicle can be captured. The camera 3b is disposed on a rear 7 of the motor vehicle 1 according to the embodiment. However, the arrangement of the camera 3a and/or the camera 3b is variously possible, however, preferably such that the environmental region 6 of the motor vehicle 1 can be captured.

Additionally or alternatively, further cameras are provided additionally to the camera 3a and/or the camera 3b. However, the method according to the invention can also be performed with only one camera, for example the camera 3a or the camera 3b.

The camera 3a and/or the camera 3b can be a CMOS camera or else a CCD camera or any image capturing device, which provides an image 8—as illustrated in FIG. 7—of a temporal sequence 9 of images.

The camera 3a and/or the camera 3b are a video camera, which continuously provides the temporal sequence 9 of images or an image sequence of images. The image 8 is a frame. The electronic evaluation device 4 then processes the sequence 9 of images preferably in real time.

FIG. 2 shows a camera coordinate system 10 of the camera 3a, 3b and a motor vehicle coordinate system 11 of the motor vehicle 1. The camera coordinate system 10 includes an x'-axis, a y'-axis and a z'-axis. The motor vehicle coordinate system 11 includes a z-axis, a y-axis and an x-axis. The transformation from the camera coordinate system 10 to the motor vehicle coordinate system 11 and vice versa can be performed based on a calibration state of the camera 3a, 3b. The calibration state includes an internal orientation and/or an external orientation. With the aid of the camera coordinate system 10 and the motor vehicle coordinate system 11, for example a motion, which is known in the motor vehicle coordinate system 11, can be transformed into the camera coordinate system 10.

FIG. 3 shows, how the camera coordinate system 10 and the motor vehicle coordinate system 11 can be disposed or oriented on the rear 7 of the motor vehicle 1. According to the embodiment, thus, the x-axis points to the rearward direction of travel of the motor vehicle 1, while the y-axis points to a lateral direction of the motor vehicle 1—presently the right side of the motor vehicle 1—and the z-axis points to a vertical direction of the motor vehicle 1. The z'-axis substantially points in the direction of the main capturing direction of the camera 3a, 3b.

FIG. 4 shows a schematic illustration of the motor vehicle 1 and a roll angular speed $\omega_x$ of the motor vehicle 1. The roll angular speed $\omega_x$ is therefore an angular speed with the rotational axis of the x-axis of the motor vehicle coordinate system 11.

FIG. 5 shows a yaw angular speed $\omega_z$ of the motor vehicle 1, wherein the yaw angular speed $\omega_z$ has the z-axis of the motor vehicle coordinate system 11 as the rotational axis. Furthermore, a motion vector $V_{CAN}$ of the motor vehicle 1 is described, which is composed of a component longitudinal to the direction of travel $V_x$ and a component transverse to the direction of travel $V_y$. The motion vector $V_{CAN}$ can for example be determined based on a speed of the motor vehicle 1. The steering angular speed for example can serve for determining the yaw angular speed $\omega_z$. The motion vector $V_{CAN}$ is in the xy-plane of the motor vehicle coordinate system 11 according to FIG. 5.

FIG. 6 describes a pitch angular speed $\omega_y$ of the motor vehicle 1, which has the y-axis of the motor vehicle coordinate system 11 as the rotational axis. The motion vector $V_{CAN}$ is divided into a vertical axis component $V_z$ in the direction of the vehicle vertical axis or in the direction of the z-axis of the motor vehicle coordinate system 11 and the longitudinal component $V_x$ according to FIG. 6. The data contributing to the determination of the motion vector $V_{CAN}$ and/or to the determination of the roll angular speed $\omega_x$ and/or the yaw angular speed $\omega_z$ and/or the pitch angular speed $\omega_y$ can for example be picked off from a CAN bus of the motor vehicle 1 and/or each be provided by a unit on the motor vehicle side, thus for example a sensor.

FIG. 7 shows the image 8 of the sequence 9 of images. In the image 8, a plurality of flow vectors $\delta$ is illustrated. The flow vectors $\delta$ are generated from characteristic pixels p via this sequence 9 of images. Thus, the characteristic pixels are determined at least in a first image of the sequence 9 of images. The characteristic pixels p can for example be associated with an object 12 or a part of the object 12 in the real world. The determination of the characteristic pixels p can for example be effected with an interest point operator. As the interest point operator, for example, a Harris operator and/or a FAST operator and/or a SIFT operator and/or a SURF operator and/or an OERB operator and/or any other corner detector determining prominent pixels can be used. The characteristic pixels p can also be determined in a further image of the image sequence 9 from time to time to provide an initialization for a new flow vector $\delta$. Based on the characteristic pixels p, now, the flow vectors $\delta$ are determined, wherein this is effected by means of a tracking method. As the tracking method, for example a Lucas-Kanade method or another method such as the block matching method can be applied. The aim is to generate a so-called sparse optical flow based on the characteristic pixels p and to attain the flow vectors $\delta$ based on the sparse optical flow.

The characteristic pixel p, which has been tracked and entails the associated flow vector $\delta$, is referred to as tracked characteristic pixel 13.

The flow vectors $\delta$ each have a vertical component $\delta_v$ as well as a horizontal component $\delta_u$ orthogonal thereto.

$$\delta_u = \frac{V'_z u - V'_x f}{z'} - \omega'_y\left(f + \frac{u^2}{f}\right) + \frac{\omega'_x uv}{f} + \omega'_z v \tag{1a}$$

$$\delta_v = \frac{V'_z v - V'_y f}{z'} + \omega'_x\left(f + \frac{v^2}{f}\right) - \frac{\omega'_y uv}{f} - \omega'_z u \tag{1b}$$

with focal length f of the camera 3a, 3b and horizontal image coordinate u of the image 8 and vertical image coordinate v of the image 8. Thus, FIG. 8 now shows the image 8 with the horizontal image axis u and the vertical image axis v. The image 8 is disposed in the camera coordinate system 10 such that the z'-axis extends substantially perpendicularly through the origin of the image coordinate system. The flow vector $\delta$ for example extends starting from the characteristic pixel p. The characteristic pixel p can be associated with a point P of the object 12 in the real world. If the point P is presented in the camera coordinate system 10, thus, the point P is denoted as a point P'. Furthermore, in FIG. 8, the rotation angles of the camera coordinate system 10 are represented, wherein $\omega'_y$ describes a rotation around the y'-axis and $\omega'_x$ describes a rotation around the x'-axis and $\omega'_z$ describes a rotation around the z'-axis. In FIG. 8, the transformed components of the motion vector $V_{CAN}$, which are denoted by $V'_x$, $V'_y$ and $V'_z$ in the camera coordinate system 10, are also marked.

Thus, each of the flow vectors $\delta$ now has the vertical component $\delta_v$ and the horizontal component $\delta_u$. Now, based on the vertical component $\delta_v$, a first depth component $z'_1$, and based on the horizontal component $\delta_u$, a second depth component $z'_2$ can be determined. This can be mathematically represented as follows:

$$z'_2(\delta_u) = \frac{V'_z u - V'_x f}{\delta_u + \omega'_y\left(f + \frac{u^2}{f}\right) - \frac{\omega'_x uv}{f} - \omega'_z v} \tag{2a}$$

$$z'_1(\delta_v) = \frac{V'_z v - V'_y f}{\delta_v - \omega'_x\left(f + \frac{v^2}{f}\right) + \frac{\omega'_y uv}{F} + \omega'_z u} \tag{2b}$$

Now, in order to obtain a validated final depth component z', it is checked if the first depth component $z'_1$ corresponds to the second depth component $z'_2$ within a tolerance range. Ideally, the first depth component $z'_1$ should correspond to the second depth component $z'_2$. However, due to possible deviations, for example measurement errors and/or calculation errors, it is assumed that in reality the tolerance range is used to determine a correspondence of the first depth component $z'_1$ and the second depth component $z'_2$. For example, the tolerance range can be 25 percent or 20 percent or 10 percent or 5 percent or 1 percent or 0.5 percent or 0 percent of the value of the first depth component $z'_1$ or the second depth component $z'_2$.

The tolerance range, which determines if the first depth component $z'_1$ and the second depth component $z'_2$ correspond to each other, and thus the validated final depth component z' is provided, can for example be described as follows.

$$|z'(\delta_u) - z'(\delta_v)| \leq Z'_{th} \cdot [z'(\delta_u) + z'(\delta_v)]/2 \tag{3}$$

Thus, the tolerance range is defined depending on a tolerance parameter $z'_{th}$, wherein $z'_{th}$ can for example correspond to a value of 0.1 or 0.15 or 0.2 or 0.25 or 0.3. If a tracked characteristic pixel p with the associated first depth component $z'_1$ and the second depth component $z'_1$, is not in the tolerance range and thus they do not correspond to each other, the final depth value thereof or the final depth component thereof is therefore assumed as infinitely far away and thus set to a very great value such as for example 1,000 meters.

FIG. 9 shows a flow diagram for detecting the object 12 in the environmental region 6. To this, in a step S1, the sequence 9 of images is provided. In a step S2, a sparse optical flow is determined in the sequence 9 of images and thus the flow vectors δ are provided. In a step S3, a motion estimation of the camera 3a, 3b is performed based on the motion vector $V_{CAN}$. To this, in a step S4, data for the motion vector $V_{CAN}$ are picked off or read out from a unit on the motor vehicle side and/or the CAN bus of the motor vehicle 1. In a step S5, a 3D position of a tracked characteristic pixel 13 is provided depending on the vertical component $\delta_v$ and the horizontal component $\delta_u$ and the validated final depth component z'. The tracked characteristic pixels 13 are combined to clusters 14 with the associated 3D position in a step S6. The combination to the clusters 14 can for example be effected such that the tracked characteristic pixels 13 of the object 12 are to be in a range from 0 to 5 meters with their x coordinate and are to be in a range from −3 meters to 3 meters with their y coordinate and are to be in a range from 0.3 meters to 1.8 meters with their z coordinate. In this case, the 3D position as well as the x coordinate, the y coordinate and the z coordinate are described in the motor vehicle coordinate system 11. In a step S7, now, the significance of the object 12 is assigned to the cluster 14.

FIG. 10 shows the image 8 with the tracked characteristic pixels 13, which due to the validated final depth component z' and an x' coordinate and y' coordinate, which are all three together orthogonal and span the camera coordinate system 10. The mathematical description of the three parameters z', x', y' is as follows:

$$z' = [z'_2(\delta_u) + z'_1(\delta_v)]/2 \quad (4a)$$

$$x' = \frac{z' \cdot u}{f} \quad (4b)$$

$$y' = \frac{z' \cdot v}{f} \quad (4c)$$

The 3D coordinates z', x', y' of the tracked characteristic pixel 13 can be transformed into the motor vehicle coordinate system 11 by the following formula:

$$\begin{pmatrix} x \\ y \\ z \end{pmatrix} = R^T \cdot \left[ \begin{pmatrix} x' \\ y' \\ z' \end{pmatrix} - T \right] \quad (5)$$

Herein, R is a rotation matrix and T is a translation rule, which can both be provided based on the calibration state. x, y, z are therefore the 3D coordinates of the tracked characteristic pixel 13 in the motor vehicle coordinate system 11. Based on the tracked characteristic pixels 13 with their 3D coordinate, thus, the height of the object 12, with which the respective tracked characteristic pixel 13 is associated, can be inferred. Thus, obstacles for the motor vehicle 1 can be recognized based on the tracked characteristic pixels 13.

FIG. 11 shows the tracked characteristic pixels 13 in a bird's eye view or a plan view.

FIG. 12 shows the tracked characteristic pixels 13 in a side view, while

Figure 1:
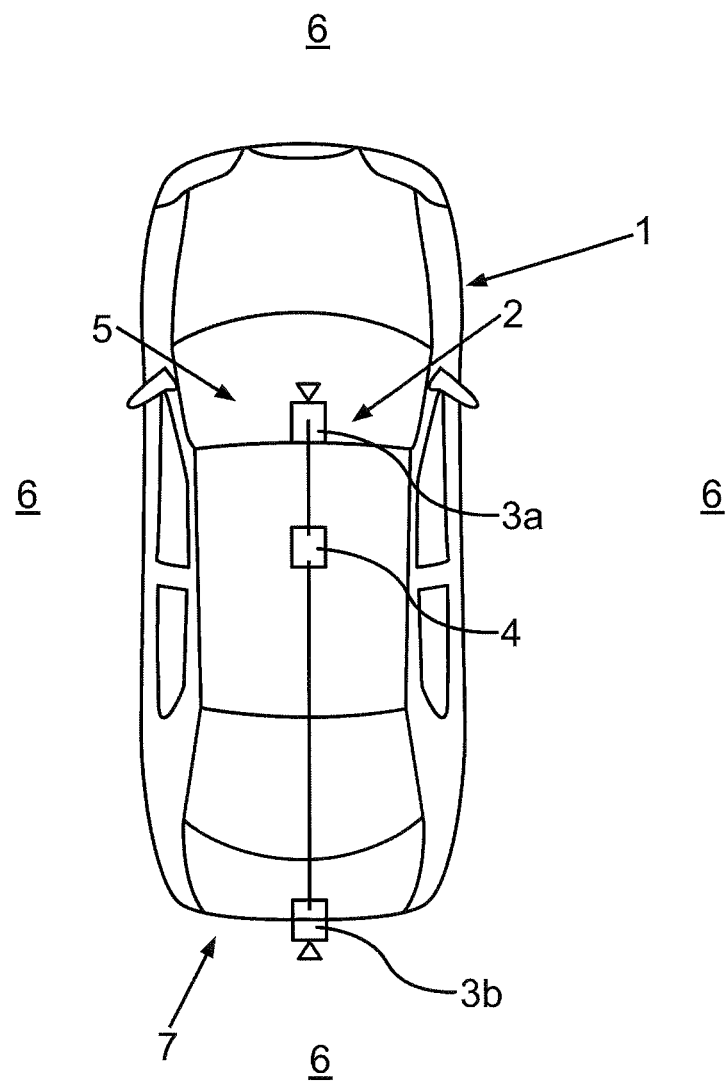
Figure 2:
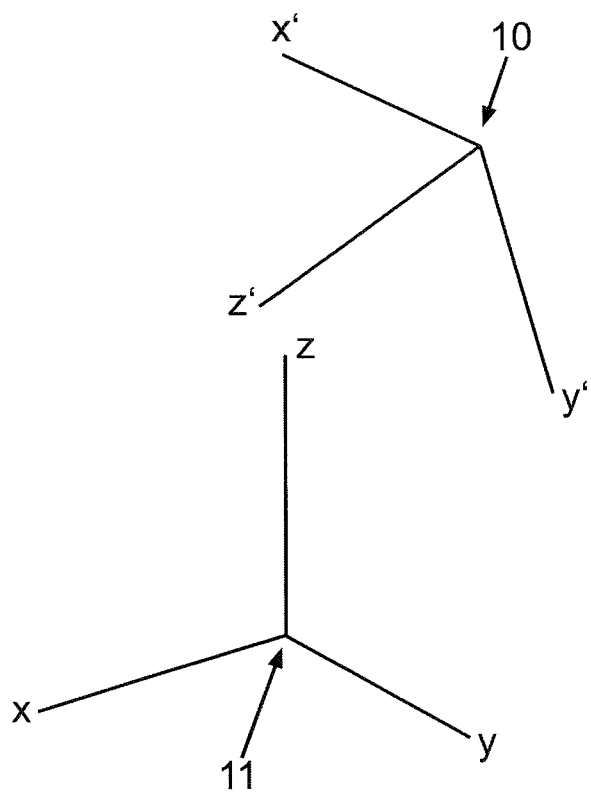
Figure 3:
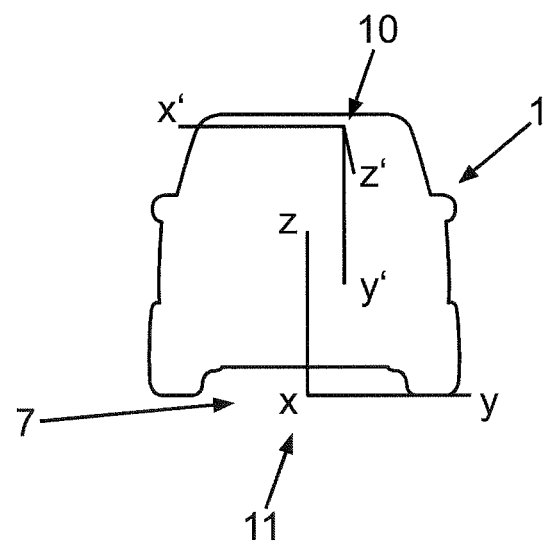
Figure 4:
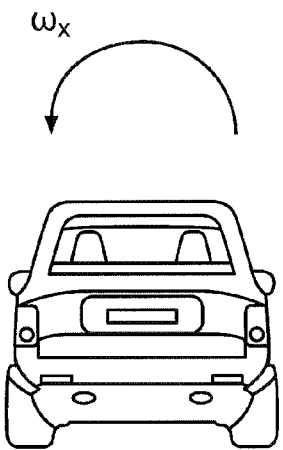
Figure 5:
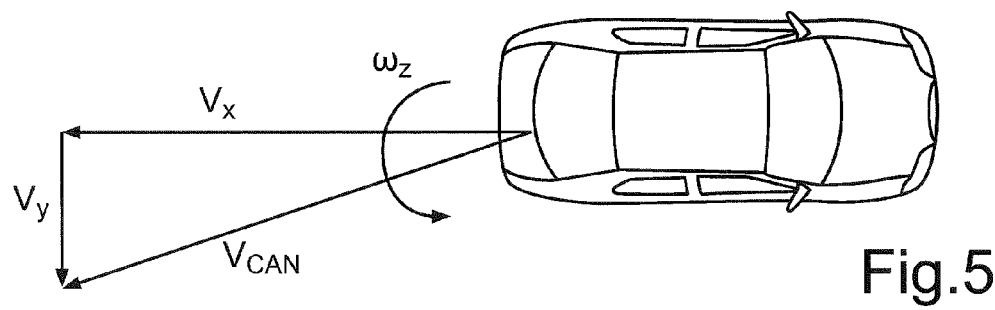
Figure 6:
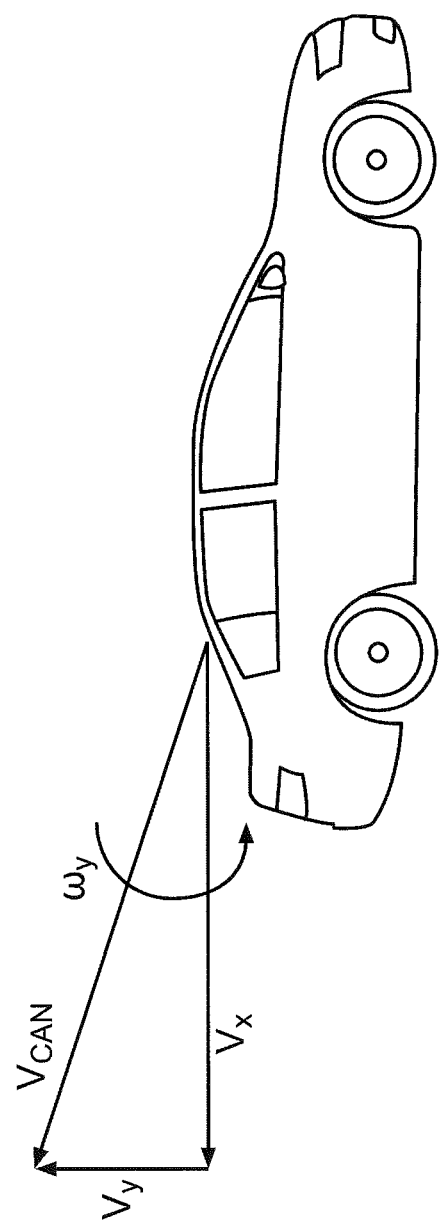
Figure 7:
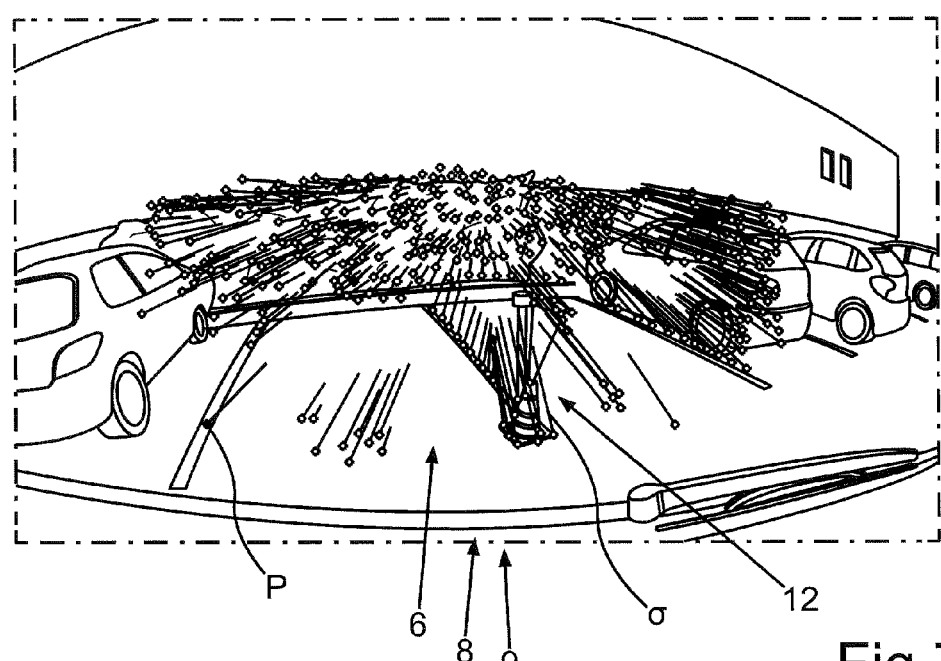
Figure 8:
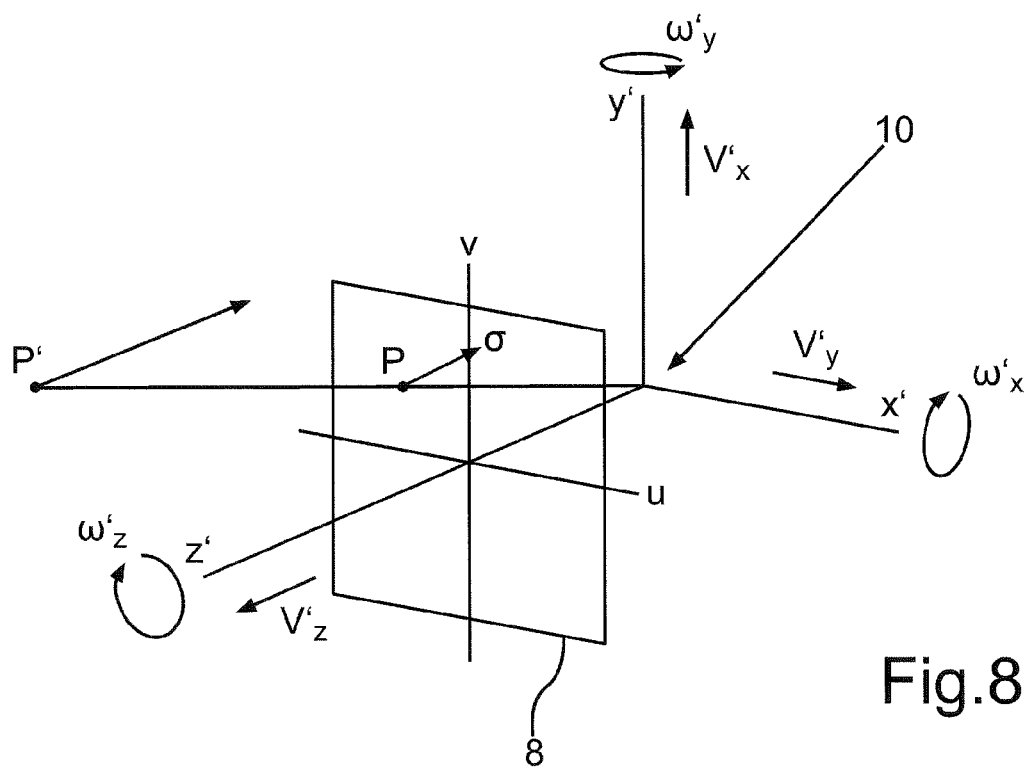
Figure 9:
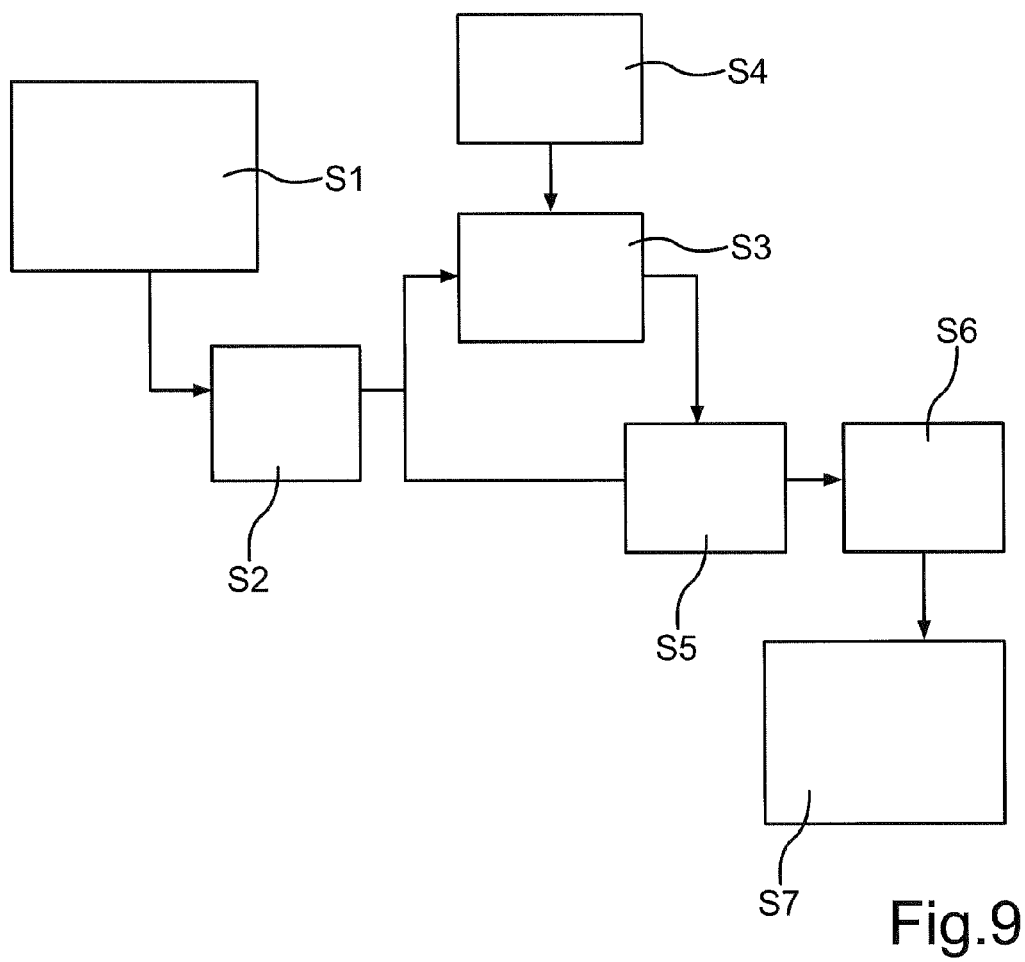
Figure 10:
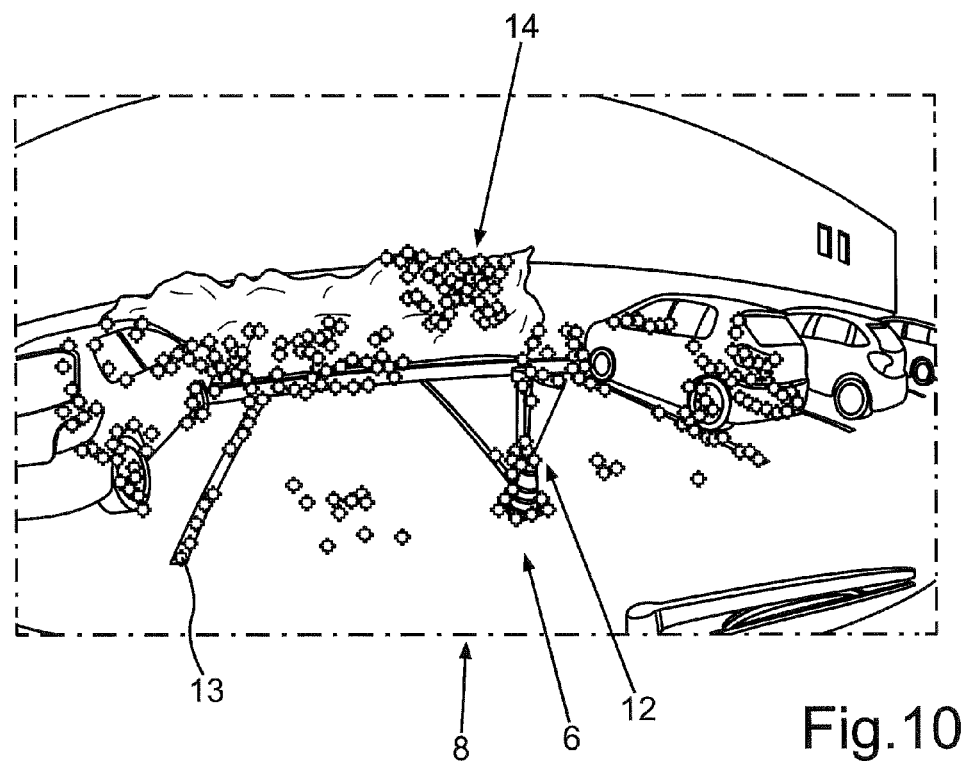
Figure 11:
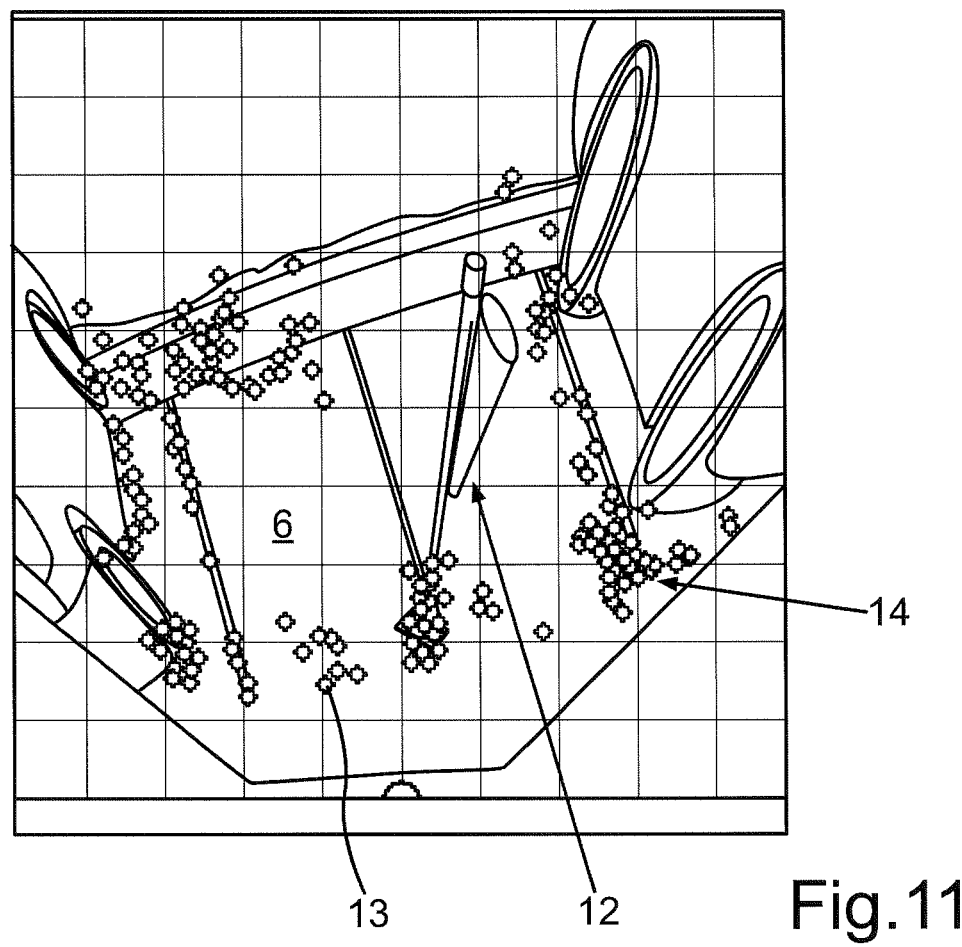
FIG. 11 shows, how the tracked characteristic pixels 13 can be viewed from other positions due to their 3D coordinate or 3D position in the space. Thus.
Figure 12:
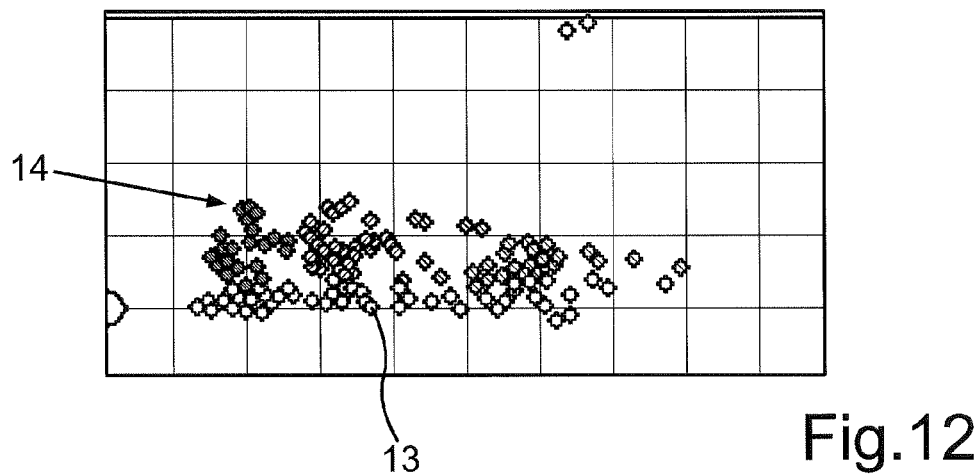
Figure 13:
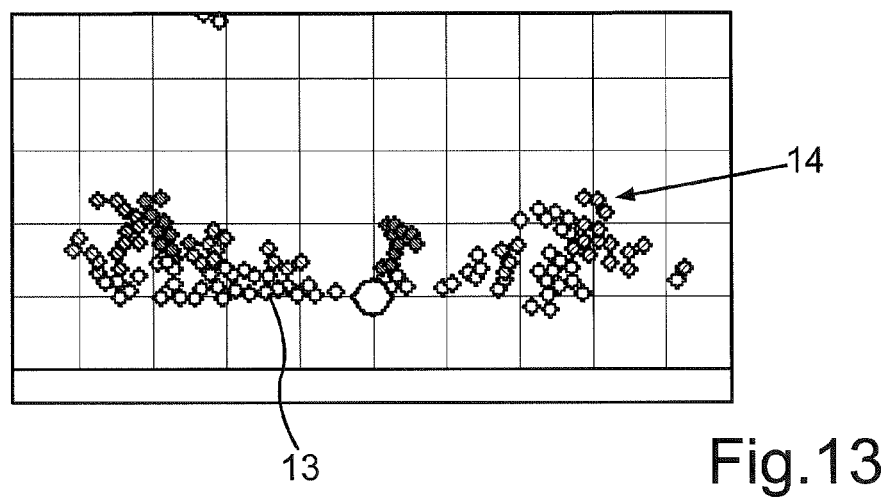
FIG. 13 shows the tracked characteristic pixels 13 in a rear view.

The tracked characteristic pixels 13 in the FIGS. 11 to 13 can for example be displayed on a display device or a display of the motor vehicle 1. Thus, the driver of the motor vehicle 1 gets the possibility of viewing the objects 12 from various perspectives based on the tracked characteristic pixels 13.

In FIGS. 10 to 13, the tracked characteristic pixels 13 are each combined to clusters 14. Preferably, one of the clusters 14 each describes one of the objects 12.

Figure 14:
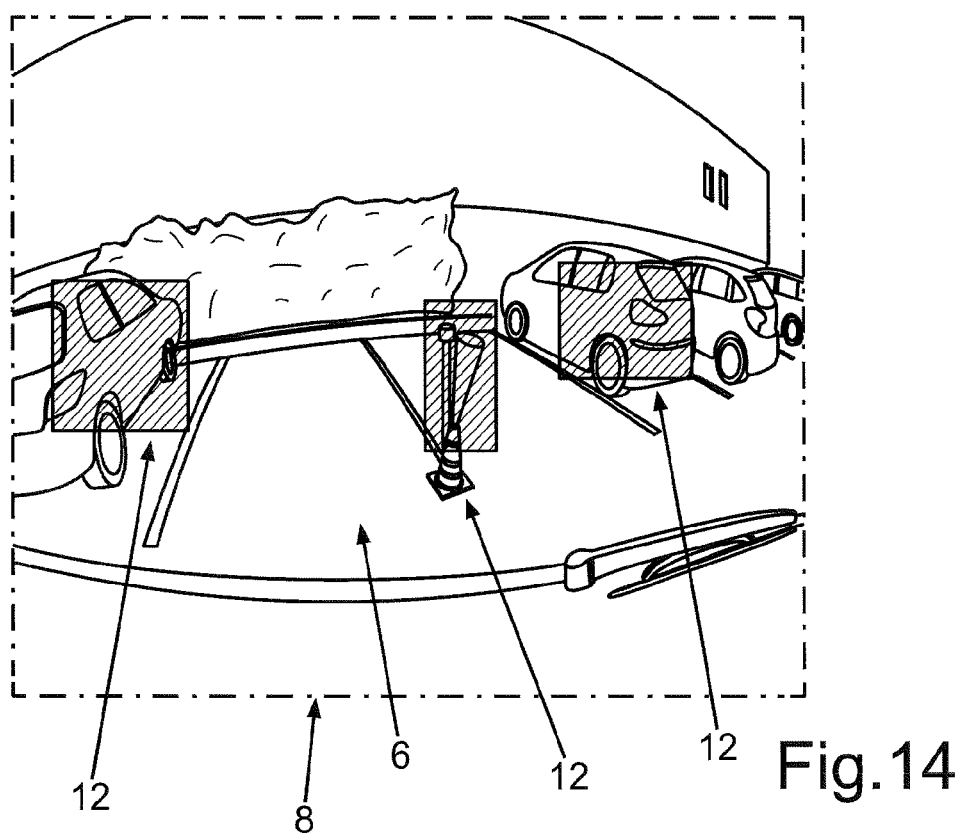

FIG. 14 shows the image 8, in which only the objects 12 are marked, which have been determined based on the clusters 14, and no longer the tracked characteristic pixels 13. The presentation of FIG. 14 can also be presented on the display device of the motor vehicle 1 to display the objects 12 constituting an obstacle to a driver of the motor vehicle 1, and to warn him of it, respectively. A warning can be acoustically and/or visually and/or haptically effected. Additionally or alternatively, the obstacle can be taken into account in semi-autonomous or autonomous driving of the motor vehicle 1.

Figure 15:
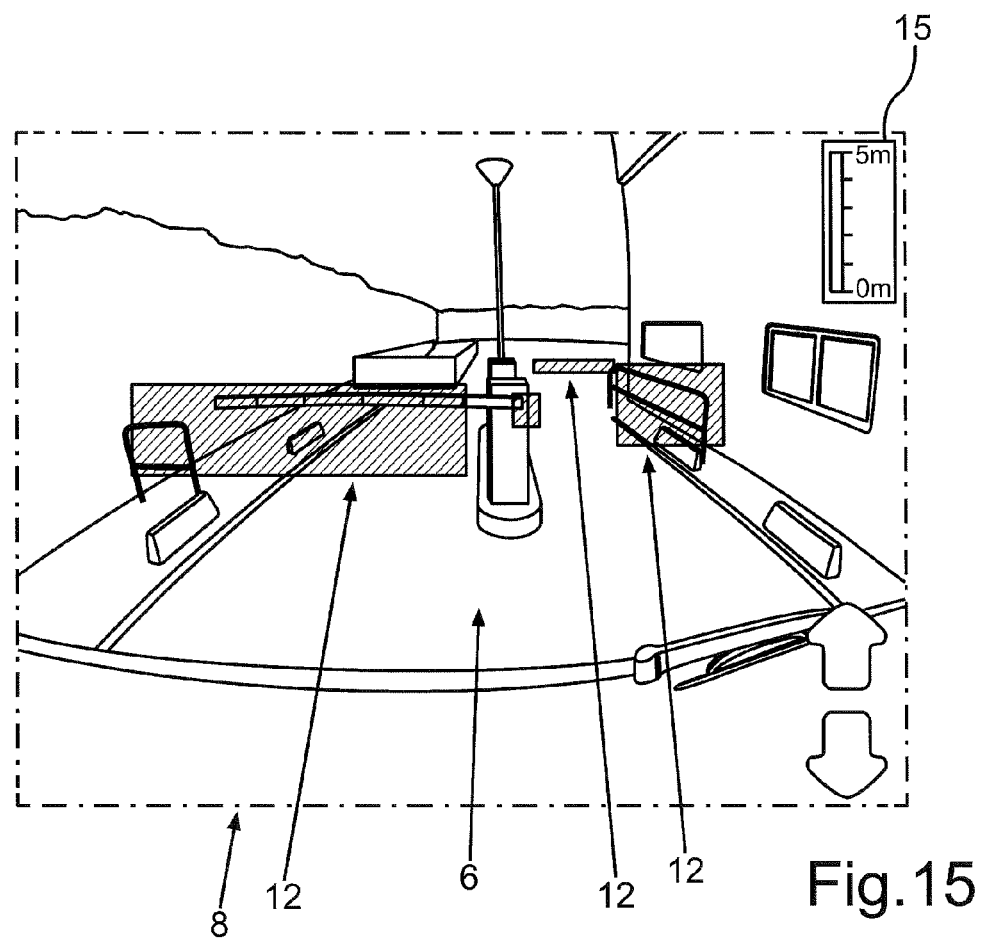

Similarly, FIG. 15 shows, which of the objects 12 can be displayed to the driver of the motor vehicle 1. In addition, in the image 8 of FIG. 15, a colored range key 15 is inserted or superimposed, which presents a color gradient, which corresponds to a range of the respective object 12. Thus, in the image 8, for example objects 12 located close to the motor vehicle 1, thus with a short range to the motor vehicle 1, can be presented in red, while the objects 12 located farther away from the motor vehicle 1 can be presented for example in green. The objects 12, which have a range between the red object and the green object, can for example be marked in yellow.

Figure 16:
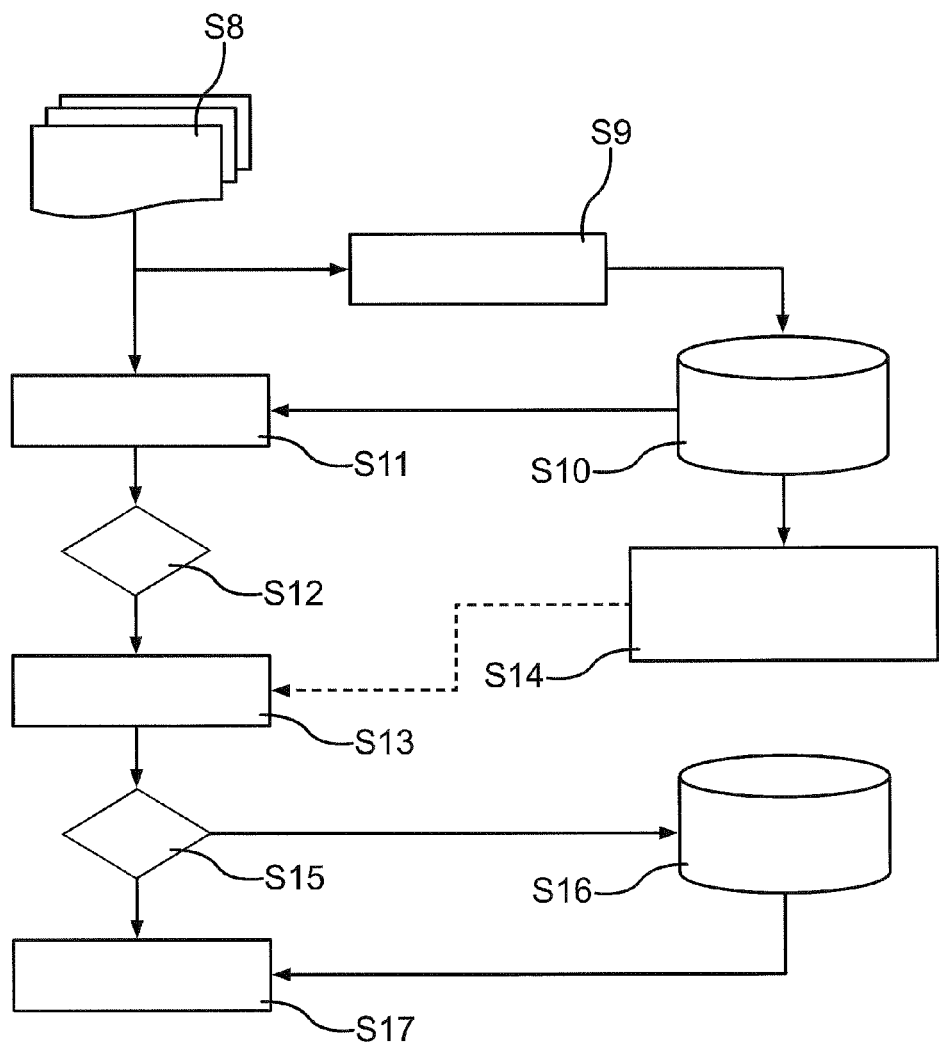

FIG. 16 shows a further flow diagram. Here, the images of the sequence 9 of images are read in a step S8. In a step S9, the characteristic pixels p are determined at least in a first image of the sequence 9 of images. The determined characteristic pixels p are stored in a memory of the electronic evaluation device 4 in a further step S10. In a step S11, the stored characteristic pixels p are tracked in the further images 8 of the sequence 9 of images from the step S8. The tracking can be effected with an optical flow method, for example a Lucas-Kanade method, as already mentioned. In a further step S12, it is examined if a predetermined path distance was traveled with the motor vehicle such that a subsequent step S13 is only performed if the predetermined path distance has been traveled. The predetermined path distance can for example be 10 centimeters or 20 centimeters or 30 centimeters or 40 centimeters. In a step S14, the motion vector $V_{CAN}$ of the motor vehicle 1 and/or the pitch angular speed $\omega_y$ and/or the yaw angular speed $\omega_z$ and/or the speed of the motor vehicle 1 are provided. In the step S13, depending on the data from step 14 and the flow vectors δ from step S12 in connection with step S13, the first depth component $z'_1$ and the second depth component $z'_2$ are determined. In a subsequent step S15, it is examined if the first depth component $z'_1$ and the second depth component $z'_2$ correspond to each other within a tolerance range. As the result of step S15, if the first depth component $z'_1$ and the second depth component $z'_2$ correspond to each other, the validated final depth component $z'$ is provided and it is stored in a step S16 as the tracked characteristic pixel 13 with the 3D position or the 3D coordinates in a further memory of the electronic evaluation device 4. In a subsequent step S17, the tracked characteristic pixels 13 are combined in the form of the clusters 14. The combined tracked characteristic pixels 13 can be viewed in the synopsis of FIG. 10 to FIG. 13.

The invention claimed is:

1. A method for detecting an object in an environmental region of a motor vehicle based on a temporal sequence of images of the environmental region, which are captured by means of a camera of the motor vehicle, the method comprising:
   determining, by an electronic evaluation device of the motor vehicle, characteristic pixels of the object in a first image of the sequence of images;
   tracking the determined characteristic pixels in at least a second image; and
   providing a plurality of flow vectors each having a vertical component and a horizontal component by the tracking,
   wherein a first depth component, which is perpendicular to the vertical component and the horizontal component is determined based on the vertical component, and a second depth component, which is also perpendicular to the vertical component and the horizontal component, is determined based on the horizontal component, and
   when the first depth component corresponds to the second depth component within a tolerance range, a validated final depth component of a tracked characteristic pixel depending on one of the characteristic pixels is provided.

2. The method according to claim 1, wherein the vertical component and/or the horizontal component are determined depending on at least one current motion vector of the motor vehicle determined by a unit on the motor vehicle side, wherein the at least one current motion vector is one selected from the group consisting of a speed and/or a yaw angular speed and/or a pitch angular speed and/or a roll angular speed.

3. The method according to claim 1, wherein in determining the vertical component and/or the horizontal component, a calibration state of the camera of either an internal orientation and/or an external orientation, is taken into account.

4. The method according to claim 1, wherein a 3D position of the object is determined depending on the validated final depth component.

5. The method according to claim 1, wherein in determining the characteristic pixels, a grid with multiple cells is taken into account, by which the first image is divided.

6. The method according to claim 5, wherein the characteristic pixels are determined depending on a minimum value specifying a minimum number of characteristic pixels per cell, and/or a maximum value specifying a maximum number of characteristic pixels per cell.

7. The method according to claim 1, wherein a direction of each one of the flow vectors is compared to the remaining flow vectors, and a direction reliability value is determined from the comparison.

8. The method according to claim 7, wherein based on the direction reliability value, it is differentiated between static objects and moved objects.

9. The method according to claim 1, wherein depending on the flow vector, a motion vector of the motor vehicle selected from the group consisting of a speed and/or a yaw angular speed, and/or a pitch angular speed and/or a roll angular speed, is determined, which is compared to a motion vector determined by a unit on the motor vehicle side.

10. The method according to claim 1, wherein the flow vectors are selected by a random sample consensus (RANSAC) method.

11. The method according to claim 1, wherein for determining the validated final depth component, a predetermined path distance must be traveled with the motor vehicle, and a subsequent validated final depth component is only determined after further traveling the predetermined path distance.

12. The method according to claim 1, wherein the tracked characteristic pixels are combined to at least one cluster based on the vertical component and/or the horizontal component and/or the validated final depth component.

13. The method according to claim 12, wherein the respective object is described with one of the at least one cluster.

14. A driver assistance system with a camera and an electronic evaluation unit, which is adapted to perform a method according to claim 1.

15. A motor vehicle with a driver assistance system according to claim 14.

16. The method according to claim 1, wherein the tolerance range is less than or equal to 25 percent of the first depth component or the second depth component.

17. The method according to claim 16, wherein the tolerance range is less than or equal to 20 percent of the first depth component or the second depth component.

18. The method according to claim 17, wherein the tolerance range is less than or equal to 10 percent of the first depth component or the second depth component.

19. The method according to claim 18, wherein the tolerance range is less than or equal to 5 percent of the first depth component or the second depth component.

20. The method according to claim 19, wherein the tolerance range is less than or equal to 1 percent of the first depth component or the second depth component.

* * * * *